(12) United States Patent
Yamazaki et al.

(10) Patent No.: US 8,279,756 B2
(45) Date of Patent: Oct. 2, 2012

(54) COMMUNICATION TERMINAL, COMMUNICATION CONTROL METHOD, AND COMMUNICATION CONTROL PROGRAM

(75) Inventors: Kenichi Yamazaki, Hino (JP); Kazunori Yamamoto, Yokohama (JP); Hideharu Suzuki, Yokohama (JP); Ken Igarashi, Yokohama (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 195 days.

(21) Appl. No.: 11/851,064

(22) Filed: Sep. 6, 2007

(65) Prior Publication Data

US 2008/0062875 A1 Mar. 13, 2008

(30) Foreign Application Priority Data

Sep. 8, 2006 (JP) ................................. 2006-243853
Mar. 9, 2007 (JP) ................................. 2007-059618
Aug. 21, 2007 (JP) ................................. 2007-215080

(51) Int. Cl.
*G01R 31/08* (2006.01)
*H04B 7/216* (2006.01)
*H04L 1/18* (2006.01)

(52) U.S. Cl. ......... 370/232; 370/235; 370/236; 714/749

(58) Field of Classification Search .......... 370/230–236, 370/335; 714/749
See application file for complete search history.

(56) References Cited

U.S. PATENT DOCUMENTS

| 2001/0015956 A1* | 8/2001 | Ono | 370/229 |
| 2002/0150048 A1 | 10/2002 | Ha et al. | |
| 2003/0074476 A1* | 4/2003 | Kim et al. | 709/246 |
| 2003/0202500 A1* | 10/2003 | Ha et al. | 370/342 |
| 2005/0105469 A1* | 5/2005 | Hao | 370/235 |
| 2006/0023634 A1 | 2/2006 | Morandin | |
| 2006/0215563 A1* | 9/2006 | Trainin | 370/236 |
| 2006/0251011 A1* | 11/2006 | Ramakrishnan et al. | 370/328 |
| 2007/0008883 A1* | 1/2007 | Kobayashi | 370/230 |
| 2010/0020693 A1* | 1/2010 | Thakur | 370/235 |

OTHER PUBLICATIONS

IETF RFC 2581, TCP Congestion Control, Apr. 1999.*
IETF RFC 3465, TCP Congestion Control with Appropriate Byte Counting (ABC), Feb. 2003.*
Tadashi Enomoto, et al., "Rate Estimation Based on ACK Intervals", Technical Report of IEICE, the Institute of Electronics, Information and Communication Engineers, vol. 97 No. 620, Mar. 20, 1998, pp. 145-150 + 2 pages w/Partial Translation.
Takayuki Sasaki, et al., "A Technique of Adaptive Bandwidth Estimation for Sack Based TCP over Wireless Networks", Technical Report of IEICE, The Institute of Electronics, Information and Communication Engineers, vol. J87-B No. 10, Oct. 10, 2004, pp. 1657-1667 + 2 pages w/Partial Translation.

(Continued)

Primary Examiner — Brandon Renner
(74) Attorney, Agent, or Firm — Crowell & Moring LLP (57) ABSTRACT

Transmission of excess segments to a network can be effectively inhibited. A received byte calculation section 14 calculates, at a sending side, the number of bytes of segments which arrive at a receiving side within a period of a minimum value of RTT measured by a minimum time measurement section 13, a target calculation section 15 calculates a target used for controlling segment transmission based on the number of bytes of the received segments calculated by the received byte calculation section 14, and a send segment control section 16 which controls segment transmission based on the target calculated by the target calculation section 15.

2 Claims, 8 Drawing Sheets

OTHER PUBLICATIONS

Fisk, Mike et al., "Dynamic Right-Sizing in TCP", Proc. of the Los Alamos Computer Science Institute Symposium, Oct. 2001, pp. 1-7.

Mark Allman., "On the Generation and Use of TCP Acknowledgements", Computer Communication Review, Oct. 1, 1998, pp. 4-21, vol. 28, No. 5, XP000914449, ACM, New York, NY, U.S.

Shaojian Fu, et al., "SCTP over Satellite Networks", Computer Communications, CCW 2003, Proceedings, 2003 IEEE 18th Annual Workshop, Oct. 20, 2003, pp. 112-116, XP010662903, IEEE, Piscataway, NJ, U.S.A.

Thomas R. Henderson, et al, "Transport Protocols for Internet-Compatible Satellite Networks", IEEE Journal on Selected Areas in Communications, Feb. 1, 1999, vol. 17, No. 2, XP011054915, IEEE Service Center, Piscataway, U.S.

European Search Report, dated Mar. 28, 2011, 8 pages.

Mark Allman., "Increasing TCP's Initial Window", Network Working Group, RFC 3390, Oct. 2002, 14 pages.

* cited by examiner

Prior Art

FIG. 8

Prior Art

COMMUNICATION TERMINAL, COMMUNICATION CONTROL METHOD, AND COMMUNICATION CONTROL PROGRAM

BACKGROUND OF THE INVENTION

1. Field of the Invention

The present invention relates to a communication terminal, a communication method, and a communication control program, and more particularly, to a communication terminal, a communication method, and a communication control program suitably applied to a congestion control method for TCP (Transmission Control Protocol).

2. Description of the Related Art

Nowadays, in TCP, which is widely used on the Internet, for avoiding network congestion, congestion control is performed using a congestion window (CWND) when a segment is transmitted.

Generally, in a congestion control algorithm of TCP, a congestion window (CWND) is set as follows:

1. At reception of an ACK (Acknowledgement)
1.1. At Slow Start $$CWND(n+1)=CWND(n)+a \times MSS$$

1.2. At Congestion Avoidance $$CWND(n+1)=CWND(n)+a/CWND(n)$$

2. At Packet loss occurrence $$CWND(n+1)=(1-b) \times CWND(n)$$

In the above expressions, MSS (Maximum Segment Size) is a maximum size of a segment which a sending side can transmit. And, CWND (Congestion Window) is a TCP state variable which limits a sendable size of TCP.

In a regular TCP, a and b are used as a=1 and b=0.5.

In this congestion control algorithm of TCP, because CWND is decreased in the event of a segment loss to perform congestion control, CWND continues to increase unless a segment loss occurs. Therefore, since CWND increases unless a segment loss occurs, a utilization factor of a receive buffer of a relay node increases, and thereby RTT (Round Trip Time) increases.

For example, a method is disclosed in which, with consideration given to Slow Start of the sending side, a receiving side notifies a sending side of twice the number of bytes that are read in an application within 1 RTT (rcv_bytes) as an advertised window, and the sending side inhibits transmission traffic of segments to twice the rcv_bytes, so that transmission of excess segments is prevented (see Dynamic Right-Sizing in TCP Mike Fisk and W. Feng 2nd Annual Los Alamos Computer Science Institute Symposium (LACSI2001), Snta Fe, N. Mex., October 2001).

Figure 7:
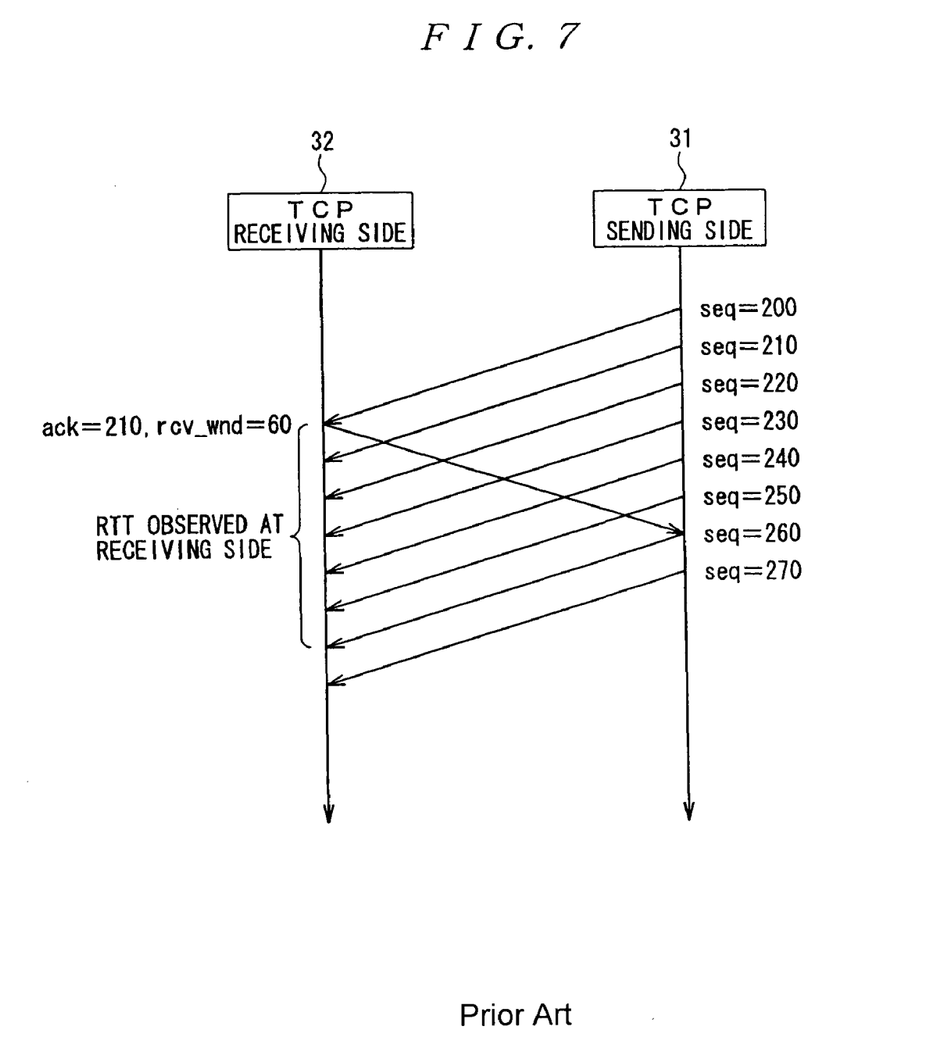
FIG. 7 is a diagram which shows a conventional RTT measurement method.

FIG. 7 is a diagram which shows a conventional RTT measurement method. Each segment is assumed to have 10 bytes of data, and an initial sequence number of each segment is indicated as seq in the diagram.

In FIG. 7, at the TCP receiving side 32, a time in which ack (acknowledge number)+rcv_wnd's seq (sequence number)−1 is received from the TCP sending side 31 using the advertised window (rcv_wnd) can be determined as 1 RTT.

For example, if ack=210 and rcv_wnd=60, a time to receive seq=210 to seq=269 (ack+rcv_wnd−1) from the TCP sending side 31 can be determined as 1 RTT at TCP receiving side 32.

However, in the above described method, since measurement of RTT and calculation of rcv_bytes are performed at the TCP receiving side 32, there are problems that measurement accuracy of RTT is degraded and excess segments are transmitted.

Figure 8:
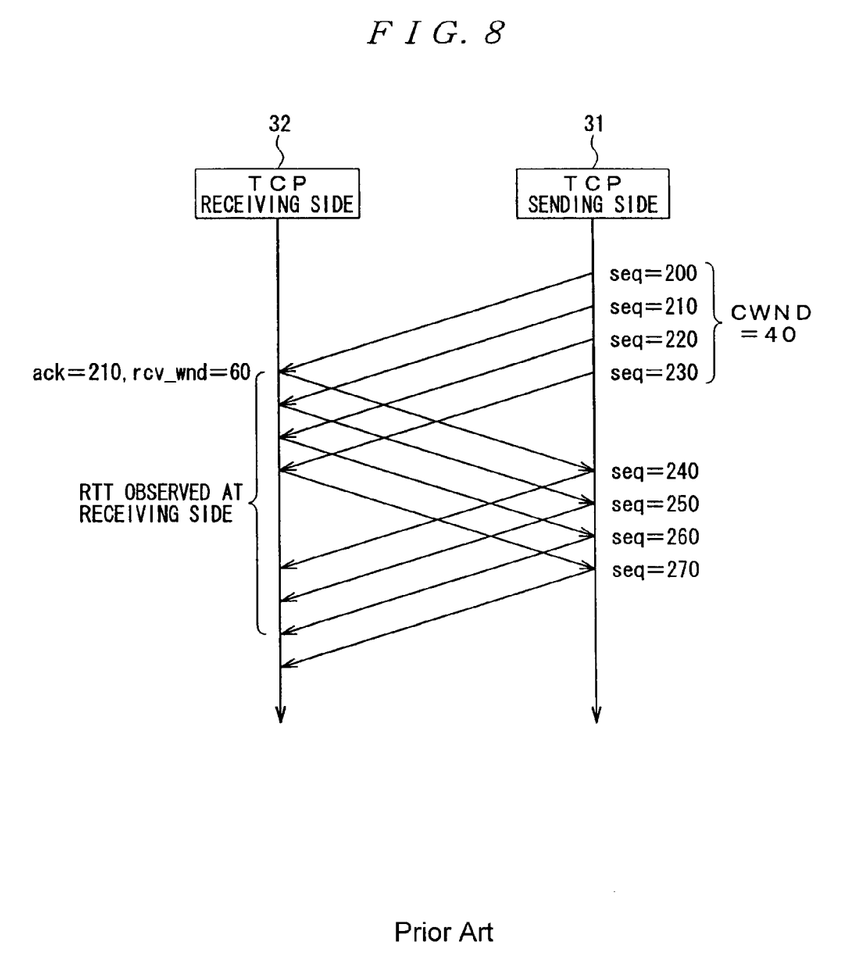
FIG. 8 is a diagram which shows a problem of the conventional RTT measurement method.

FIG. 8 is a diagram which shows a problem of a conventional RTT measurement method.

In FIG. 8, if CWND is smaller than rcv_wnd, RTT that is longer than usual is measured and rcv_bytes is increased, and therefore excess segments are transmitted. For example, if ack=210, rcv_wnd=60, and CWND=40, an interval between transmission times of seq=230 and seq=240 is increased. Consequently, since a time in which seq=210 to seq=269 are received is determined as 1 RTT at TCP receiving side 32, RTT that is longer than usual is measured.

Additionally, in the above described method, relative to the ideal case for notifying a sending side of twice rev_bytes as an advertised window and utilizing a maximum value of measured rcv_bytes, that is, "the number of bytes sent in 1 RTT=the number of bytes received in 1 RTT", excess segments are transmitted.

Accordingly, an object of the present invention is to provide a communication terminal, a communication control method, and a communication control program which can effectively inhibit transmission of excess segments to a network.

SUMMARY OF THE INVENTION

To solve the above described problem, a communication terminal according to claim 1 includes a received byte calculation section which calculates, at a sending side, the number of bytes of segments which arrive at a receiving side within a certain period, and a send segment control section which controls the number of segments to be sent based on the number of bytes of the segments calculated by the received byte calculation section.

In addition, a communication terminal according to claim 2 includes a minimum time measurement section which measures a minimum value of RTT, a received byte calculation section which calculates, at a sending side, the number of bytes of segments which arrive at a receiving side within a period of the minimum value of the RTT measured by the minimum time measurement section, and a send segment control section which controls the number of segments to be sent based on the number of bytes of the segments calculated by the received byte calculation section.

In addition, according to claim 3, the communication terminal is characterized in that the minimum time measurement section resets the minimum value of the RTT when a segment has not been sent for a predetermined time or more, when a size of a congestion window is below an initial window size, or when an RTT less than or equal to a value defined by the minimum value of the RTT has not been measured for a predetermined measurement time.

In addition, according to claim 4, the communication terminal is characterized in that the send segment control section limits transmission of the segments based on a maximum size of a segment which the sending side can send or the number of acknowledged bytes.

In addition, according to claim 5, the communication terminal further includes a congestion window calculation section which calculates a congestion window or a slow start threshold value at a time when an ACK is received or a packet loss occurs without consideration of the number of bytes of segments calculated by the received byte calculation section, wherein the send segment control section controls segment transmission based on the congestion window or the slow start threshold value calculated by the congestion window calculation section.

In addition, a communication control method according to claim 6 includes the steps of calculating, at a sending side, the number of bytes of segments which arrive at a receiving side within a certain period, and controlling the number of segments to be sent based on the number of bytes of the segments calculated at the sending side.

In addition, a communication control program according to claim 7 causes a computer to perform the steps of calculating, at a sending side, the number of bytes of segments which arrive at a receiving side within a certain period, and controlling the number of segments to be sent based on the number of bytes of the segments calculated at the sending side.

As described above, according to the present invention, since the number of bytes of segments which have arrived at a receiving side is calculated at a sending side, there is no need to notify the sending side of the number of bytes of segments which have arrived at the receiving side in consideration of circumstances of the sending side, so that transmission of excess segments to a network can be effectively inhibited.

DETAILED DESCRIPTION OF THE PREFERRED EMBODIMENTS

A communication terminal according to an embodiment of the present invention will hereinafter be described with reference to the drawings.

Figure 1:
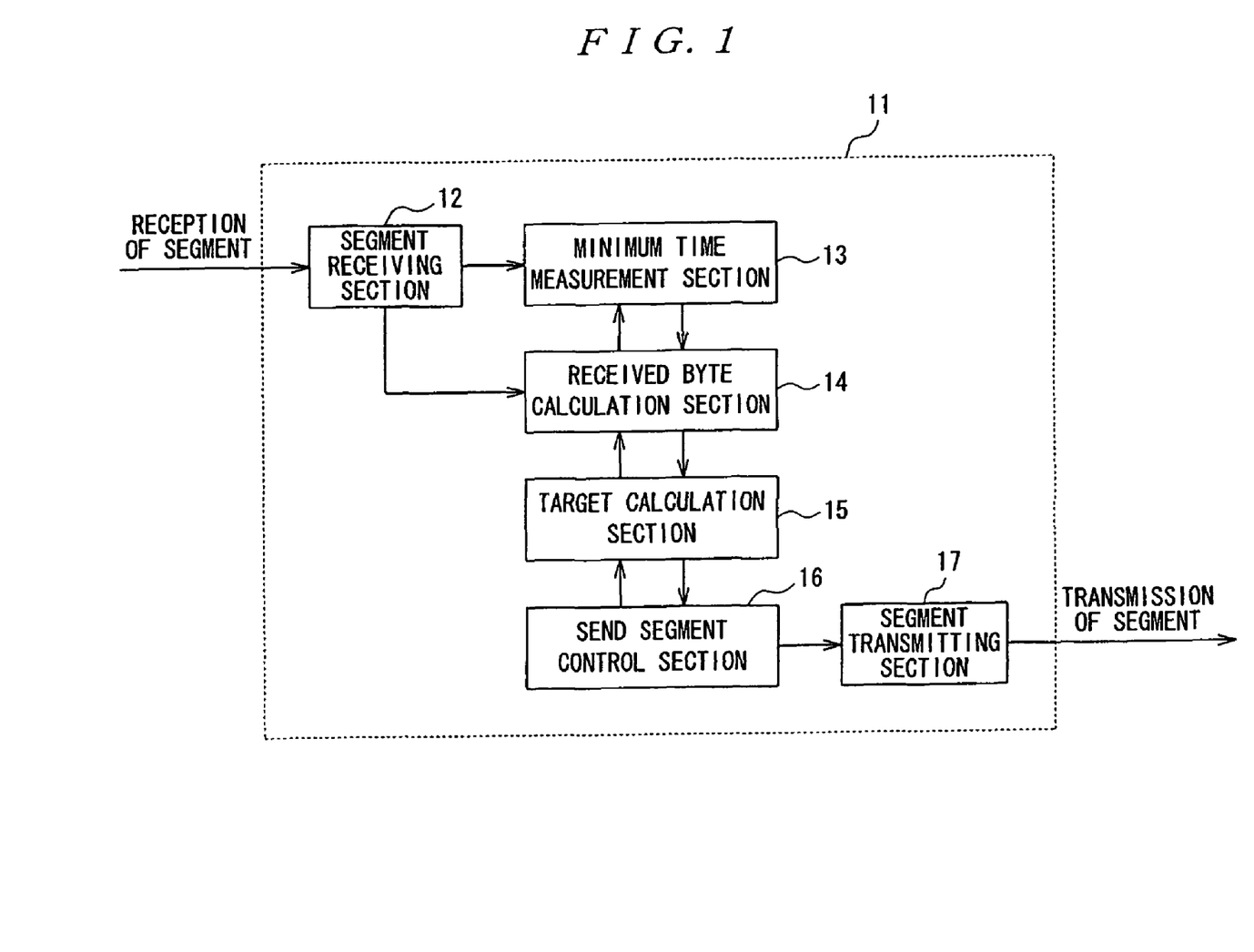
FIG. 1 is a block diagram which shows a schematic configuration of a sending terminal according to a first embodiment of the present invention.

FIG. 1 is a block diagram which shows a schematic configuration of a sending terminal according to a first embodiment of the present invention.

In FIG. 1, a sending terminal 11 is provided with a segment receiving section 12 which receives a segment sent through a network such as the Internet, a minimum time measurement section 13 which measures a minimum value of RTT, a received byte calculation section 14 which calculates, at a sending side, the number of bytes of segments which arrive at a receiving side within a period of the minimum value of the RTT measured by the minimum time measurement section 13, a target calculation section 15 which calculates a target used for controlling segment transmission based on the number of bytes of the received segments calculated by the received byte calculation section 14, a send segment control section 16 which controls segment transmission based on the target calculated by the target calculation section 15, and a segment transmitting section 17 which transmits segments through the network such as the internet.

Then, the minimum time measurement section 13 can measure RTT in the same way as in TCP. Specifically, in a case where a Timestamp Option is available, the minimum time measurement section 13 can determine (current time)–(Timestamp Echo) as RTT when an ACK is received.

On the other hand, in a case where the Timestamp Option is not available, the minimum time measurement section 13 can determine (current time)–(time at which an acknowledged segment is transmitted) as RTT when the ACK is received.

Then, the minimum time measurement section 13 continues to measure RTT while segments are transmitted, and can use a minimum value of RTT (rtt_min) for calculating the number of bytes of received segments (rcv_bytes) while updating a minimum value of RTT (rtt_min) each time a minimum value of RTT (rtt_min) is measured.

Additionally, in consideration of a case where RTT is greatly changed by switching of a route, movement of a receiving terminal, or the like, a minimum value of RTT (rtt_min) can be reset in the following cases:

(1) Case where a segment has not been sent for 1 RTT or more

In this case, as 1 RTT, RTO (Retransmission Timeout) which is calculated from RTT in TCP can be used aside from a minimum value of RTT (rtt_min).

(2) Case where a CWND size is below an initial window size (3) Case where an RTT less than or equal to rtt_min× (target/rcv_bytes+1) has not been measured for several RTTs (target will be described later). As a measurement period, 2 RTT or more is set here in consideration of 1 RTT for measurement of rcv_bytes and 1 RTT for a period of controlling the number of send segments based on the measured value.

Next, when a minimum value of RTT (rtt_min) is measured by the minimum time measurement 13, the received byte calculation section 14 calculates the number of bytes of received segments (rcv_bytes) from information of an ACK or SACK (Selective Acknowledgement) received within a time of the minimum value of RTT (rtt_min).

Figure 2:
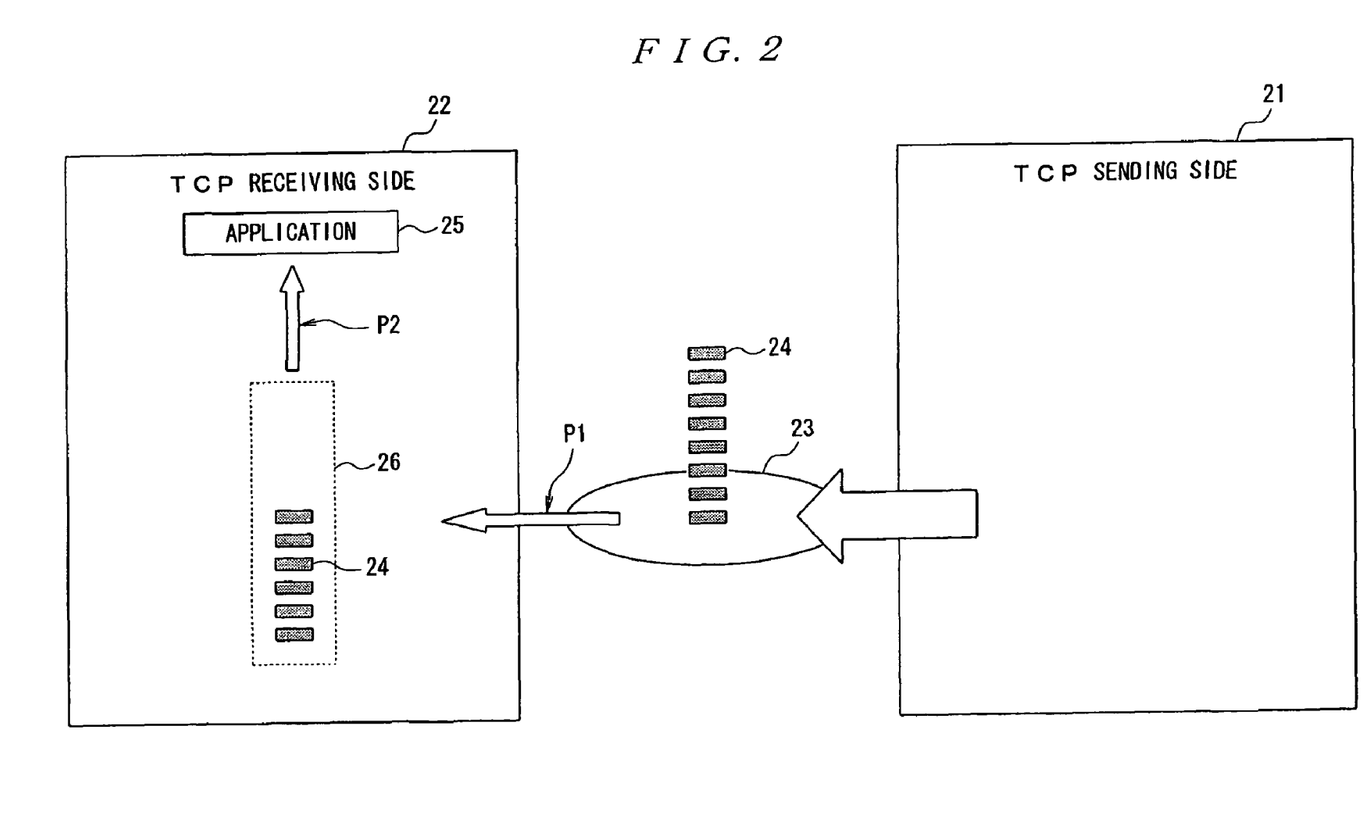
FIG. 2 is a block diagram which shows points of measurement of the number of bytes of received segments according to one embodiment of the present invention in comparison with a conventional example.

FIG. 2 is a block diagram which shows points of measurement of the number of bytes of received segments according to one embodiment of the present invention in comparison with a conventional example.

In FIG. 2, a segment 24 is sent from a TCP sending side 21 to a TCP receiving side 22 through a network 23. Then, the segment 24 received by the TCP receiving side 22 is held in a receiving buffer 26, and read into an application 25 though the receiving buffer 26.

Figure 5:
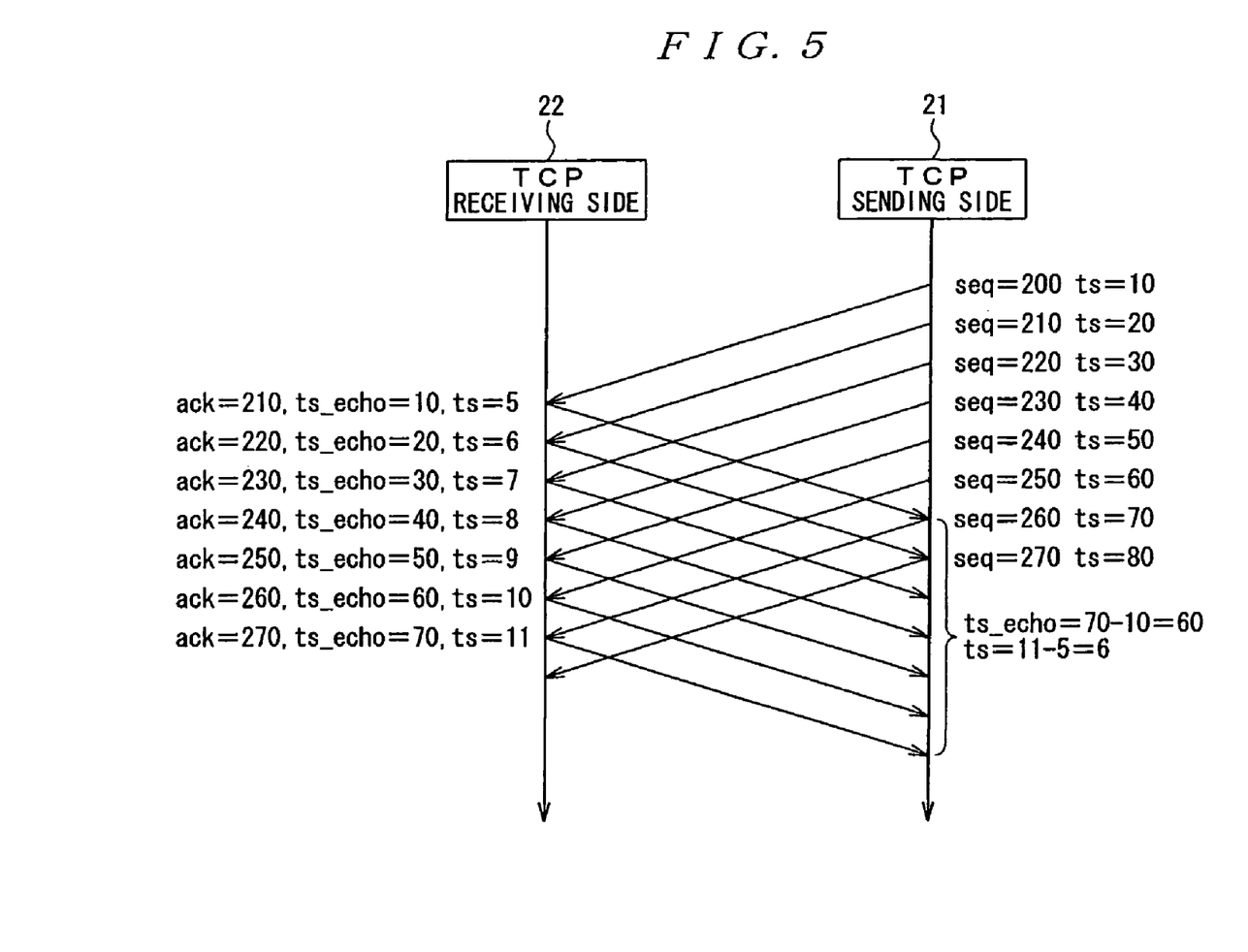
FIG. 5 is a diagram which shows an example of correction of a transmission time of an ACK at a sending side.

In the method of FIG. 5, the number of bytes of segment 24 at time point P2 at which the segment is read into the application 25 is used for congestion control. Therefore, if there is retransmission of a segment, the number of segments at time point P2 at which the segments are read into the application 25 is underestimated or overestimated, and thus accurate control cannot be performed.

On the other hand, in the present embodiment, the number of bytes of segment 24 at time point P1 at which the segment is received is used for congestion control, so that transmission of excess segments to a network can be effectively inhibited.

Figure 3:
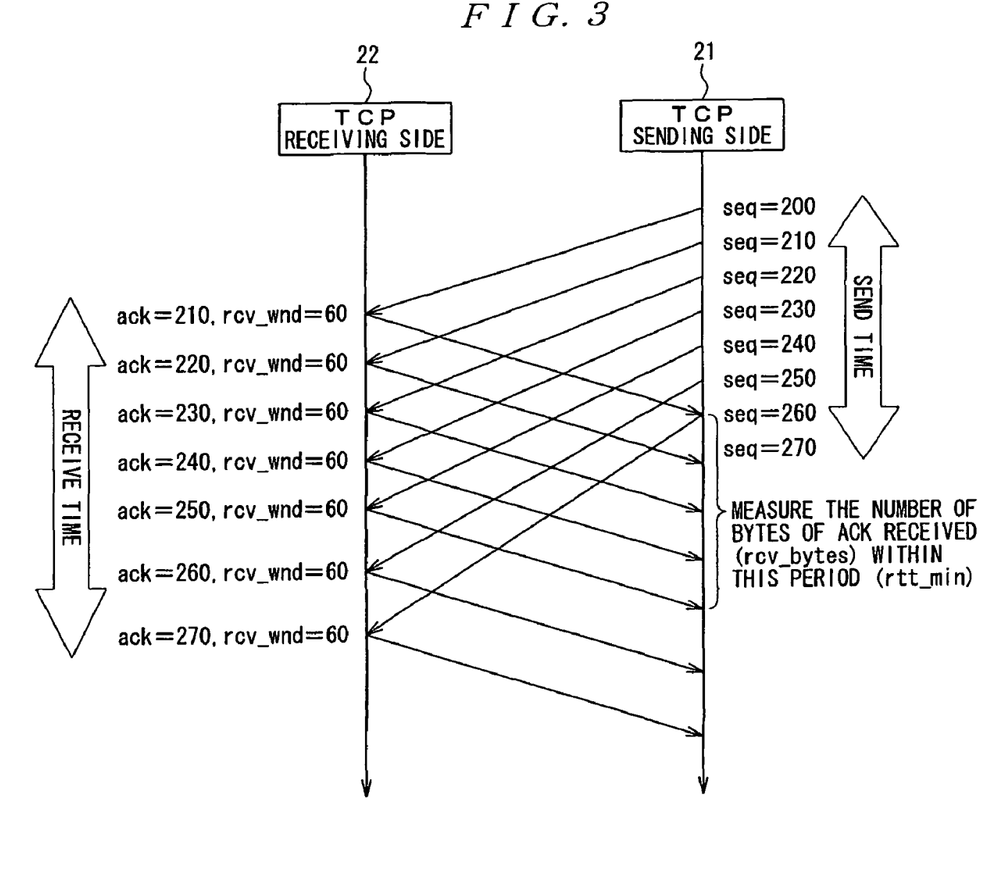
FIG. 3 is a diagram which shows a measurement method of the number of bytes of received segments according to one embodiment of the present invention.

FIG. 3 is a diagram which shows a measurement method of the number of bytes of received segments according to one embodiment of the present invention.

In FIG. 3, at the TCP sending side 21, the number of bytes of received segments (rcv_bytes) is calculated from information of an ACK received from the TCP receiving side 22 within a time of a minimum value of RTT (rtt_min).

Specifically, the number of bytes of received segments (rcv_bytes) can be measured as described below.

Case where SACK Option is supported

A value obtained by subtracting a sequence number of a first segment whose ACK is not received at the start of measurement (drs_snd_una) from a maximum sequence number whose reception is notified to the receiving terminal by an ACK that is received within a time of a minimum value of RTT (rtt_min) (rcv_ack) can be used.

In addition, during retransmission of segments, for considering the total number of bytes of segments retransmitted within a time of a minimum number of RTT (rtt_min), a value obtained by subtracting the total number of bytes of segments (sack_start) notified by the SACK Option at the start of measurement from the total number of bytes of segments (sack_end) notified by the SACK Option of a received ACK is added to an original value.

In other words, rcv_bytes=rcv_ack−drs_snd_una+(sack_end−sack_start).

In addition, if a segment loss does not occur, both of sack_end and sack_start are zero, and thus rcv_bytes=rcv_ack−drs_snd_una. In addition, if a segment loss is eliminated within a time of a minimum value of RTT (rtt_min), sack_end becomes zero, and only sack_start is enabled.

Case where SACK Option is not supported

In this case, in consideration of the number of redundant ACKs (ACK of rcv_ack is less than or equal to a minimum segments whose ACK is not received (snd_una)), the number of bytes of received segments (rcv_bytes) can be calculated.

Specifically, a value obtained by subtracting a sequence number of a first segment whose ACK is not received at the start of measurement (drs_snd_una) from a sequence number whose reception is notified to the receiving terminal by an ACK that is received at last within a time of a minimum value of RTT (rtt_min) (rcv_ack) can be used.

In addition, during retransmission of segments, for considering the total number of bytes of retransmitted segments, a value obtained by subtracting the number of redundant ACKs received at the start of measurement×MSS (dack_start) from the number of redundant ACKs received within the timed a minimum number of RTT (rtt_min)×MSS (dack_end) is added to an original value.

In other words, rcv_bytes=rcv_ack−drs_snd_una+(dack_end−dack_start).

In addition, if the number of bytes of received segments (rcv_bytes) increases to more than the number of bytes of received segments (rcv_bytes) which was calculated last time, the value may be updated each time an ACK is received.

In addition, when a segment loss does not occur, both of sack_end and sack_start are zero.

Then, in a case where a queuing delay occurs also about an ACK path, the number of bytes of received segments (rcv_bytes) may not be accurately measured depending on conditions. To deal with this, a transmission time of the ACK is used to remove effects of the queuing delay of the ACK path so that the number of bytes of the received segments (rcv_bytes) can be accurately measured.

Figure 4:
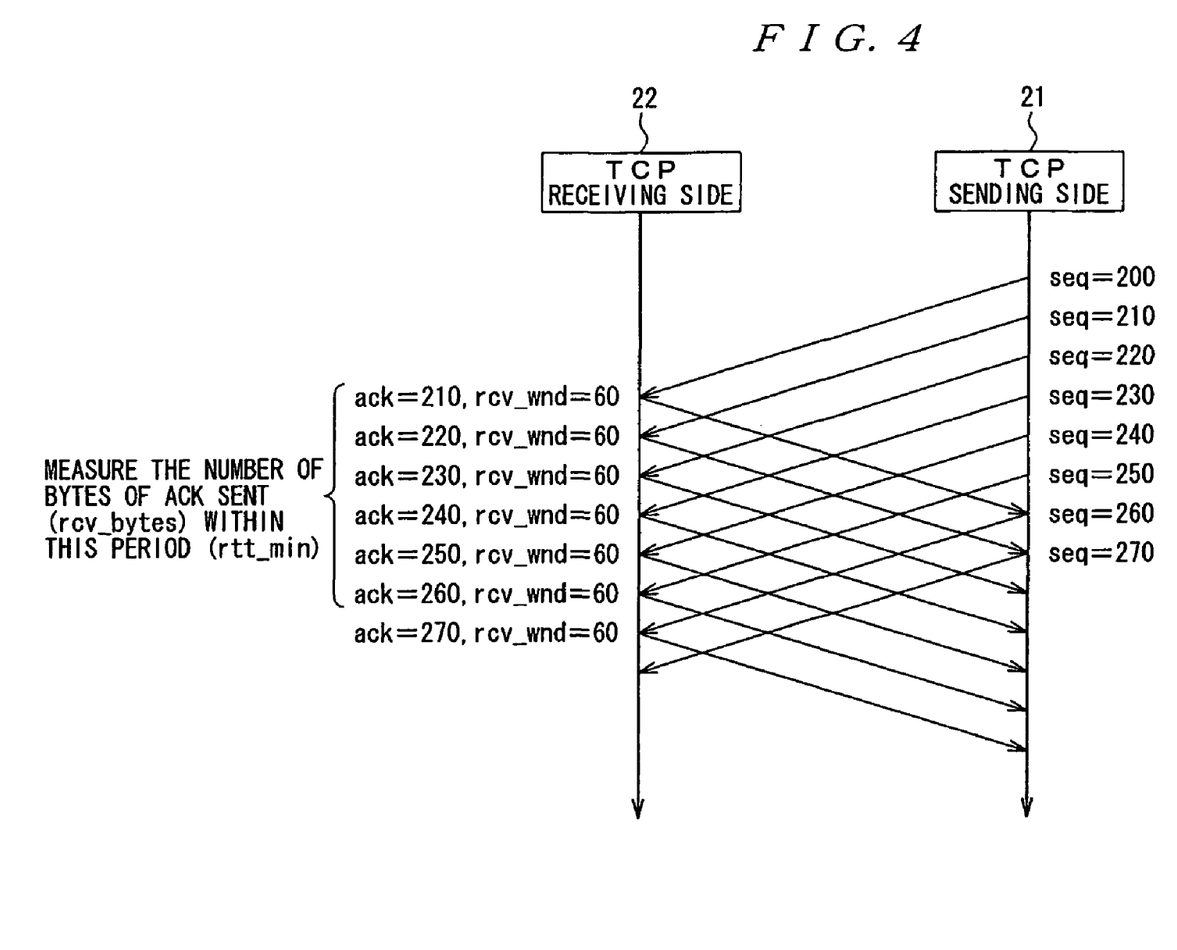
FIG. 4 is a diagram which shows another example of the measurement method of the number of bytes of received segments according to one embodiment of the present invention.

FIG. 4 is a diagram which shows another example of the measurement method of the number of bytes of received segments according to one embodiment of the present invention.

In FIG. 4, when a Timestamp Option which is similar to that of the TCP sending side 21 has been added to an ACK, the number of bytes of received segments (rcv_bytes) can be measured by referring to a transmission time of an ACK transmitted within a time of a minimum value of RTT (rtt_min). However, if granularities of Timestamp Options used at the receiving and sending sides are different, a transmission time of the ACK is required to be corrected at the sending side.

FIG. 5 is a diagram which shows an example of correction of a transmission time of an ACK at a sending side.

In FIG. 5, ts represents transmission time of a segment, and ts_echo represents Timestamp Echo. At the sending side, measurement is performed for a certain period upon reception of an ACK, and increments of ts and ts_echo of an ACK received within the period are calculated and used for correction. In FIG. 5, since an increment of ts_echo is 60 and an increment of ts is 6, rcv_bytes is calculated using ACKs in the time until a time obtained by adding one tenth of rtt_min to a transmission time of an ACK at the start of transmission.

Then, the target calculation section 15 of FIG. 1 calculates a target based on the number of bytes of received segments calculated by the received byte calculation section 14.

As calculation methods of a target, five kinds of methods are assumed as follows:

(1) A method which uses twice the maximum value of the number of bytes of received segments (rcv_bytes) measured by the received byte calculation section 14

(2) A method which uses twice the number of bytes of received segments (rcv_bytes) measured by the received byte calculation section 14

(3) A method which uses an average of the number of bytes of two most recent received segments (rcv_bytes) measured by the received byte calculation section 14

(4) A method which uses twice a weighted average of the number of bytes of received segments (rcv_bytes) measured by the received byte calculation section 14

For example, target may equal to (average of the number of bytes of received segments (rcv_bytes) measured up to then (av_rcv_bytes)×7/8+(rcv_bytes)×1/8)×2.

(5) A method which uses an arbitrary constant α

For example, when rcv_bytes+α×MSS≧cwnd and cwnd<Slowstart Threshold (ssthresh), target may equal to rcv_bytes×2.

In other cases, target may equal to rcv_bytes+α×MSS.

(6) A method which uses a weighted average and a weighted average deviation of the number of bytes of received segments (rcv_bytes) measured by the received byte calculation section 14.

For example, a weighted average of the number of bytes of received segments (rcv_bytes) is calculated as (avg_rcv_bytes)=(avg_rcv_bytes)×7/8+(rcv_bytes)×1/8, a weighted average deviation of the number of bytes of received segments (rcv_bytes) is calculated as (var_rcv_bytes)=(var_rcv_bytes)×7/8+|rcv_bytes−avg_rcv_bytes|×1/8, and, using obtained var_rcv_bytes, target can be determined as target=avg_rcv_bytes+var_rcv_bytes×4.

The constant α can be set to any value depending on conditions of a network, and, at least, it can be set to greater than or equal to a value of cwnd increased to maximum within 1 RTT (1 MSS in TCP) where cwnd≧ssthresh.

In addition, an arbitrary constant β can be used for preventing a target from becoming less than or equal to a predetermined value such that β×MSS is used as a lower limit of the target. While the constant β can be set to any value, the value may be an initial window size.

Then, the send segment control section 16 of FIG. 1 controls segment transmission based on the target calculated by the target calculation section 15. Additionally, for preventing transmission of segments in burst when a target increases rapidly, the send segment control section 16 can limit actual segment transmission using a value called space.

The space can be set as follows:

When space<target, space is set in a way that space=space+2MSS for each reception of ACK.

When space>target, the two kinds of methods are assumed:

(1)
A method in which space is set in a way that space=target (2)
A method in which space is set in a way that space=space−MSS for each reception of ACK In a case where the number of acknowledged bytes can be calculated, when space<target, space is set in a way that space=space+the number of acknowledged bytes for each reception of ACK.

When space>target, the two kinds of methods are assumed:

(1) A method in which space is set in a way that space=target (2) A method in which space is set in a way that space=space−the number of acknowledged byte/2 for each reception of ACK In addition, if an ACK is a redundant ACK, it is treated as 1 MSS, and, if the number of acknowledged bytes is less than 1 MSS when space is to be reduced, space is not reduced until the number of acknowledged bytes becomes 1 MSS or more.

Then, the segment transmitting section 17 in FIG. 1 transmits a segment subjected to transmission control by the send segment control section 16. Specifically, a segment can be transmitted according to minimum values of space, cwnd, and rcv_wnd, and, if space value is less than minimum values of cwnd and rcv_wnd, the segment can be transmitted according to space.

Thereby, transmission of segments can be inhibited based on the number of bytes of received segments (rcv_bytes) calculated at the sending side, so that transmission of excess segments to a network can be effectively inhibited.

Additionally, for preventing communication speed from reduced when the cwnd is small, control may be performed without space if the number of bytes of received segments (rcv_bytes) is less than or equal to cwnd+α where cwnd is cwnd at a time when the number of bytes of the received segment (rcv_bytes) is measured and α is a constant.

Further, for guaranteeing the fairness with TCP which does not perform control using space during retransmission, CWND and SSTHRESH at a time when an ACK is received or a packet loss occurred may be set using a value of CWND obtained in a condition that control using space is inhibited.

Figure 6:
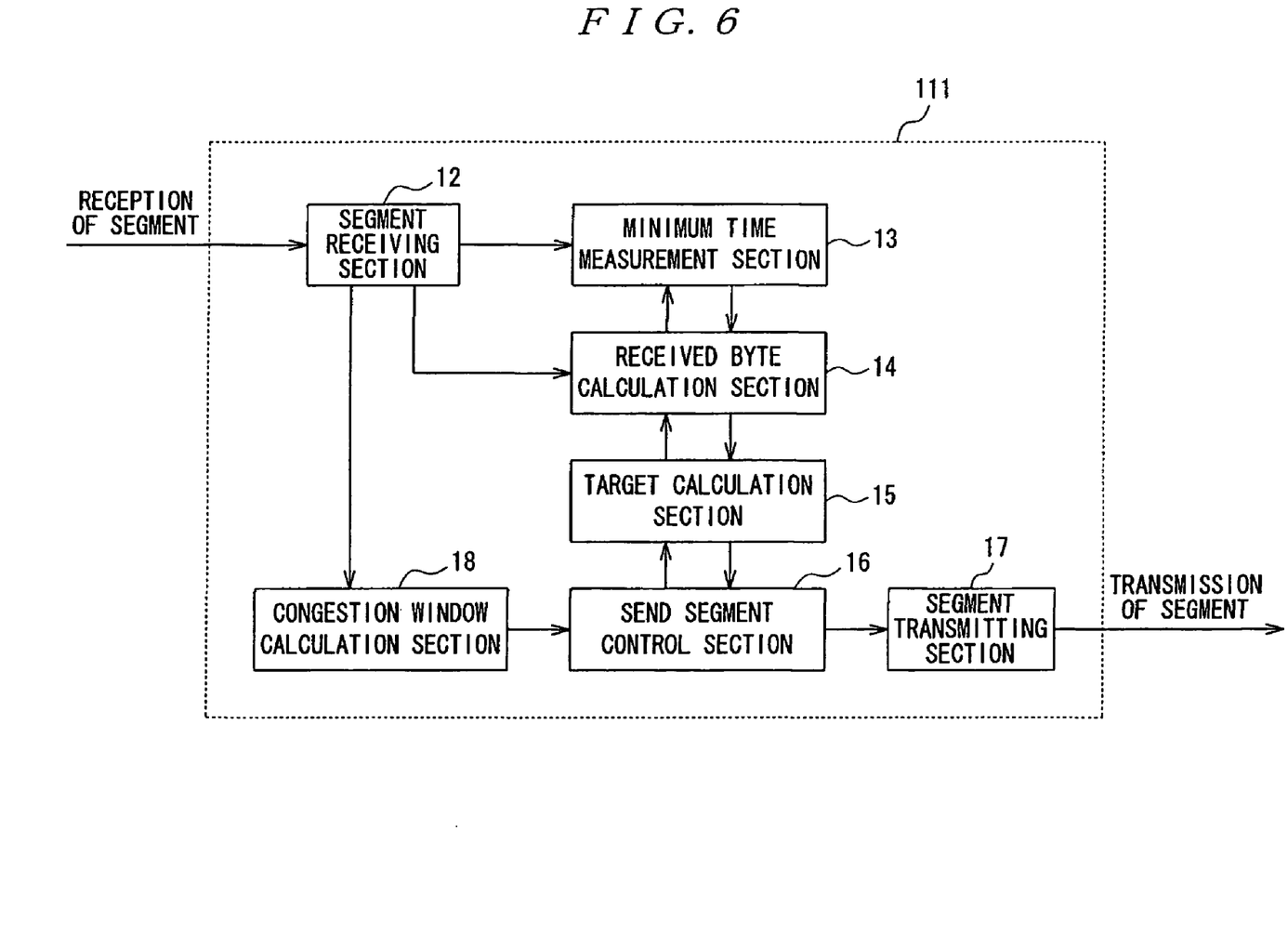
FIG. 6 is a block diagram which shows a schematic configuration of a sending terminal according to a second embodiment of the present invention.

FIG. 6 is a block diagram which shows a schematic configuration of a sending terminal according to a second embodiment of the present invention.

In FIG. 6, in addition to the configuration of FIG. 1, the sending terminal 111 is further provided with a congestion window calculation section 18 which calculates CWND and SSTHRESH at a time when an ACK is received or a packet loss occurs.

The congestion window calculation section 18 can calculate CWND and SSTHRESH at a time when an ACK is received or a packet loss occurs as described below.

When a packet loss occurs, SSTHRESH and CWND are determined using WND (window) as follows:

$$WND=Max(CWND, CWND\_est)$$

Where CWND_est is a value of CWND which would be obtained in a case that control using space is not performed.

2.1. At FF (Fast Retransmit & Fast Recovery)

$$SSTHRESH=(1-b) \times WND$$

CWND is set to equal to SSTHRESH.

2.2. At occurrence of RTO (Retransmit Timeout)

$$SSTHRESH=(1-b) \times WND$$

CWND is set to equal to 1×MSS.

However, if the number of bytes of received segments (rcv_bytes) is less than or equal to cwnd+α (constant) at a time when the number of bytes of the received segments (rcv_bytes) is measured, it may be determined that a packet loss is not caused by congestion so that CWND and SSTHRESH may not be reduced.

In the above equations, MSS (Maximum Segment Size) is a maximum segment size which the sending side can transmit. CWND (CONGESTION WINDOW) is a TCP state variable which limits a sendable size of TCP. SSTHRESH (SLOWSTART THRESHOLD) is a slow start threshold value.

In a regular TCP, a and b are used as a=1 and b=0.5.

Then, in a case that control using space is not performed, the congestion window calculation section 18 calculates CWND and SSTHRESH at a time when an ACK is received or a packet loss occurs according to the above equations. Then, the send segment control section 16 transmits a segment through the segment transmitting section 17 while controlling segment transmission based on the CWND and SSTHRESH calculated by the congestion window calculation section 18.

The minimum time measurement section 13, the received byte calculation section 14, and the target calculation section 15 can be implemented by causing a computer to perform a program in which instructions for executing processings performed by such means are described.

Then, the program is stored in a storage medium such as a CD-ROM, and the storage medium is attached to a computer of the sending terminal 11 to install the program in the computer, so that processings of the minimum time measurement section 13, the received byte calculation section 14, and the target calculation section 15 can be achieved. In addition, the program can be easily distributed by downloading the program through a network.

Although, in the method in FIG. 7, rcv_bytes is determined in consideration of conditions of the network 23 and the TCP receiving side 22 in FIG. 2, rcv_bytes is determined in consideration of conditions of the network 23 in the present embodiment. However, when a data transmission speed of the network 23 is much slower than a speed at which the application 25 reads data, it is preferable that the number of bytes of segments stayed at the TCP receiving side 22 is also taken into consideration.

As a method which takes conditions of the TCP receiving side 22 into consideration when determining rcv-bytes, the number of bytes of segments stayed in the receiving buffer 26 (buf_bytes) can be estimated from an ACK.

Specifically, buf_bytes can be estimated by the equation: buf_bytes=(maximum rcv_wnd received through ACK)−(current rcv_wnd).

The number of bytes of segments stayed in the receiving buffer 26 of the TCP receiving side 22 can be taken into consideration indirectly by calculating buf_bytes when rcv_bytes is calculated and subtracting the buf_bytes from a target. However, when a segment has been retransmitted, it is preferable that a target is calculated without consideration of buf_bytes because a segment stayed in the receiving buffer 26 is likely to be a waiting segment.

Although segment transmission is controlled based on a target calculated by the target calculation section 15 in the above described embodiment, control of segment transmission may be performed by calculating a target at the receiving side and notifying the sending side of the target calculated at the receiving side.

What is claimed is:

1. A communication control method performed by a communication terminal comprising a memory and a controller, the controller comprising a received byte calculation section, a target calculation section, and a send segment control section, the method comprising the steps of:
  calculating, by the received byte calculation section, at a sending side, the number of bytes of a received segment received by a receiving side within a certain period, when the sending side receives an acknowledgement (ACK) for the received segment;
  calculating, by the target calculation section, a target representing a target transmission segment size used for controlling transmission of a transmission segment based on the number of bytes of the received segment calculated by the received byte calculation section; and
  controlling, by the send segment control section, a number of transmission segments to be sent with the use of a value called space for preventing the transmission segment from being sent in burst when the target calculated by the target calculation section increases rapidly;
  wherein in a case where the number of acknowledged bytes cannot be calculated, and when an initial value of space is smaller than the target calculated by the target calculation section, the send segment control section controls the space to be the space plus 2× Maximum Segment Size (MSS) for each reception of the ACK;
  wherein in the case where the number of acknowledged bytes cannot be calculated, and when the initial value of space is greater than the target calculated by the target calculation section, the send segment control section controls the space to be the target or the space to be the space minus MSS for each reception of the ACK;
  wherein in a case where the number of acknowledged bytes can be calculated, and when the initial value of space is smaller than the target, the send segment control section controls the space to be equal to the space plus the number of acknowledged bytes for each reception of the ACK; and
  wherein in the case where the number of acknowledged bytes can be calculated, and when the initial value of space is greater than the target, the send segment control section controls the space to be equal to either the target or the space minus a half of the number of acknowledged bytes for each reception of the ACK.

2. A computer-readable non-transitory storage medium storing a communication control program causing a computer to perform the steps of:
  the computer serving as a communication terminal comprising a memory and a controller, the controller comprising a received byte calculation section, a target calculation section, and a send segment control section;
  calculating, by the received byte calculation section, at a sending side, the number of bytes of a received segment received by a receiving side within a certain period, when the sending side receives an acknowledgement (ACK) for the received segment;
  calculating, by the target calculation section, a target representing a target transmission segment size used for controlling transmission of a transmission segment based on the number of bytes of the received segment calculated by the received byte calculation section; and
  controlling, by the send segment control section, a number of transmission segments to be sent with the use of a value called space for preventing the transmission segment from being sent in burst when the target calculated by the target calculation section increases rapidly;
  wherein in a case where the number of acknowledged bytes cannot be calculated, and when an initial value of space is smaller than the target calculated by the target calculation section, the send segment control section controls the space to be the space plus 2× Maximum Segment Size (MSS) for each reception of the ACK; and
  wherein in the case where the number of acknowledged bytes cannot be calculated, and when the initial value of space is greater than the target calculated by the target calculation section, the send segment control section controls the space to be the target or the space to be the space minus MSS for each reception of the ACK;
  wherein in a case where the number of acknowledged bytes can be calculated, and when the initial value of space is smaller than the target, the send segment control section controls the space to be equal to the space plus the number of acknowledged bytes for each reception of the ACK; and
  wherein in the case where the number of acknowledged bytes can be calculated, and when the initial value of space is greater than the target, the send segment control section controls the space to be equal to either the target or the space minus a half of the number of acknowledged bytes for each reception of the ACK.

* * * * *